United States Patent [19]

Mark

[11] 4,295,000
[45] Oct. 13, 1981

[54] ELECTRODE-POSITION CONTROL IN ARC FURNACES

[75] Inventor: Edgar Mark, Lohr, Fed. Rep. of Germany

[73] Assignee: G. L. Rexroth GmbH, Lohr, Fed. Rep. of Germany

[21] Appl. No.: 110,855

[22] Filed: Jan. 10, 1980

[30] Foreign Application Priority Data

Jan. 13, 1979 [DE] Fed. Rep. of Germany ....... 2901198

[51] Int. Cl.$^3$ .......................................... H05B 7/156
[52] U.S. Cl. ..................................................... 13/13
[58] Field of Search ..................................... 13/13, 12

[56] References Cited

U.S. PATENT DOCUMENTS 3,173,052  3/1965  Moore ................................. 13/13 X Primary Examiner—Roy N. Envall, Jr.
Attorney, Agent, or Firm—Michael J. Striker

[57] ABSTRACT

An electrode-position control for arc furnaces includes a hydraulic cylinder-and-piston unit 1 having a cylinder chamber 43 and a piston 1 connectable with an electrode 4 to be moved; a control valve 8; a first pressure conduit 14, 15 which connects the control valve 8 with a source of pressure fluid, and a working conduit 17, 18 which connects the valve 8 with the chamber 43; a pre-selectable two-way valve 5, 6 in each of the conduits 14, 15; 17, 18 a second pressure conduit 34, 33, 17, 42 connecting the chamber 43 directly with the source; and a pre-selectable two-way valve 7 arranged in the second pressure conduit 34, 33, 17, 42 in parallel to the control valve 8, the valve 7 being closed when the valves 5, 6 are open, and vice versa.

5 Claims, 1 Drawing Figure

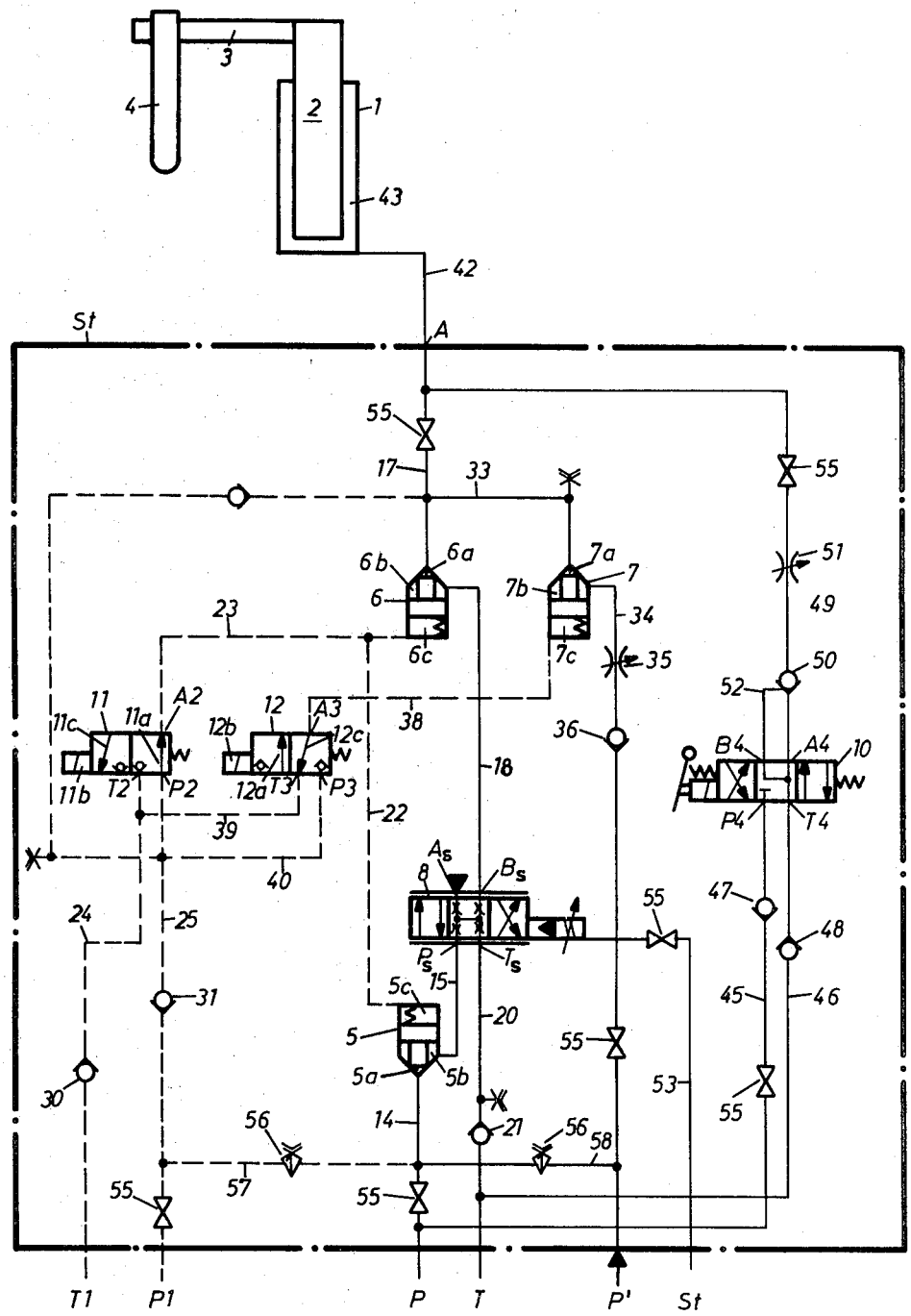

ELECTRODE-POSITION CONTROL IN ARC FURNACES

BACKGROUND OF THE INVENTION

The present invention relates to controlling of the position of the electrodes in arc furnaces.

It is known in the art to change the position of arc-furnace electrodes by means of hydraulic cylinders which carry a support whereon the electrodes are mounted. The cylinders receive their hydraulic working fluid via an electrically controlled valve interposed in the fluid line. An important safety problem with this state of the art is that any malfunction of the valve raises the possibility that it will become impossible to move the electrodes out of the melting zone, or even to maintin them in their operating position.

SUMMARY OF THE INVENTION

It is an object of the invention to overcome the disadvantages of the prior art.

A more particular object is to provide an improved electrode-position control for arc furnaces, which is not possessed of the afore-mentioned disadvantages.

A still more specific object is to provide a control of the type in question which, in the event of a malfunction of the electrically operated valve, assures the the electrodes can be reliably moved out of the melting zone or, optionally, can be maintained in their operating position.

A concomitant object is to provide a control as set forth above, wherein—in the event of malfunction—the electrically operated valve can be replaced in a simple manner and without having to interrupt the arc furnace operation.

Yet a further object is to provide such a control wherein the control devices, especially of the hydraulic components, are united to form a compact and largely leakfree structural unit.

Pursuant to the above objects, and still others which will become apparent hereafter, one aspect of the invention resides in a control of the type under discussion which, briefly stated, may comprise a hydraulic cylinder-and-piston unit having a cylinder chamber and a piston connected with an electrode to be moved; a control valve; a first pressure conduit connecting the control valve with a source of pressure fluid, and a working conduit connecting the valve with the chamber; a pre-selectable two-way valve in each of the conduits; a second pressure conduit connecting the chamber directly with the source; and a pre-selectable two-way valve arranged in the second pressure conduit in parallel to the control valve, the valve being closed when the valves are open, and vice versa.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a circuit diagram of a control embodying the invention.

DESCRIPTION OF THE PREFERRED EMBODIMENTS

The arc furnace itself is not illustrated; such furnaces are known per se. The drawing does, however, illustrate an electrode 4 of the furnace (there are usually three such electrodes provided per furnace, each independent of the others).

The electrode 4 is supported on a console 3 which in turn is mounted on the plunger piston 2 of a cylinder-and-piston unit 1. Reference character St designates the control plate on which hydraulically actuated two-way seat-type valves 5, 6 and 7 are installed in such a manner as to be readily replaceable. Also mounted (e.g., by threading) on the plate St are an electrically actuatable control valve 8, a manually or electrically actuated slide valve 10 and electromagnetically operable pre-selection control valves 11 and 12.

A conduit 14 connects the valve chamber 5a of the two-way valve 5 with the pump connection port P of the plate St; similarly, the valve chamber 5b of valve 5 is connected via channel 15 with the port Ps of the electrically actuatable control valve 8. Valve chamber 6a of valve 6 is connected with the working-fluid port A via conduit 17, and valve chamber 6b is similarly connected via conduit 18 with the port Bs of the electrically actuatable valve 8, the port As of which is blocked so that the valve 8 operates as a three-position valve. The port Ts of valve 8 is connected via conduit 20 and one-way valve 21 with the reservoir connection port T of the plate St. The control chambers 5c, 6c of the two-way valves 5, 6 are connected with one another by a conduit 22 and with the port $A_2$ of the precontrol valve 11 via conduit 23. Port $T_2$ of valve 11 is connected with port $T_1$ via a conduit 24 provided with one-way valve 30; similarly, port $P_2$ is connected with port $P_1$ of plate St via conduit 25 and interposed one-way valve 31.

When valve 11 is in the illustrated starting position a, the port $P_2$ is connected via 11a with port $A_2$, so that both control chambers 5c, 6c of the valves 5, 6 are subject to the pressure prevailing at the port $P_1$ of plate St, whereby the valves 5, 6 are caused to assume their illustrated closure positions. Under these circumstances the electrically actuated control valve 8 is not in use, i.e., not operational.

If, now, the valve 11 is moved from the illustrated position a to the position b by activation of the electromagnet 11b, then the port $A_2$ becomes connected with port $T_2$ via 11c, with the result that the pressure fluid in chambers 5c, 6c is discharged to the reservoir which communicates with the port $T_1$. Because of the pump pressure prevailing in the chamber 5a, 6b the two-way valves moves to their open (throughput) positions. Now the control valve 8 is in readiness to operate and, depending upon its position, it connects the cylinder chamber 43 of the cylinder 2 with the pump port P or with the reservoir port T of the plate St. The valve chamber 7a of valve 7 is connected with conduit 17 via line 33 and is thus connected with the port A of plate St. The chamber 7b of the valve 7 is connected via line 34 and the adjustable throttle 35 and one-way valve 36 with the port P′ of plate St. Chamber 7c of valve 7 communicates via line 38 with the port $A_3$ of the magnetically operated valve 12. Port $T_3$ of valve 12 is connected by line 39 with the conduit 24 leading to port T, and its port $P_3$ is connected via line 40 with the conduit 25 which leads to the control fluid port $P_1$.

In the illustrated starting position a of the valve 12 the chamber 7c of the valve 7—unlike the valves 5 and 6—is connected via 12c with the reservoir port $T_1$. This permits the pressure fluid flowing via port P, to the chamber 7b to move the valve to open position, so that the pressure fluid can then pass via chamber 7a, conduits 33, 17 to the port A and on via line 42 to the chamber 43 of unit 1, causing the plunger piston 2 to become extended out of the unit and moving the electrode 4 (upwardly, in the drawing). The speed of movement of piston 2 is determined by the setting of throttle 35 in conduit 34.

When the electromagnet 12b of valve 12 is energized the valve 7 moves to the position b, in which port $A_3$ is connected with port $P_1$ via 12a. This causes chamber 7c of vlave 7 to become pressurized and the valve to move to closed position so that communication between post P' and the chamber 43 is interupted.

Since the magnets 11b, 12b can be simultaneously energized and de-energized, the valves 11, 12 may simultaneously be switched to one or the other operating position so that, when the valves 5, 6 associated with valve 8 are open, the valve 7 which is connected in parallel to the valve 8 is closed, and vice versa. In the event of a malfunction of the overall control, and a resulting de-energization of the magnets 11b, 12b of valves 11, 12, the valves 4, 6 close and the valve 7 opens as an automatic consequence. Valve 8 is rendered inoperative by the closed valves 5, 6. Due to the simultaneous opening of the valve 7 the working fluid flows via this valve into the chamber 43, causing the piston 2 to become extended out of the cylinder of unit 1 and thus moving the electrode 4 out of the melt in the arc furnace, i.e., to a position above the upper melt level. In the event that such an extraction of the electrode 4 is not desired, then only the magnet 11b is de-energized whereas magnet 12b remains energized. In that case the valve 11 causes the two valves 5, 6 to move to their closed positions so that the working position of the electrode 4 is fixed; i.e., the electrode 4 will remain in place. After the malfunction of the system has been cleared, energization of the magnet 11b, 12b causes valves 11, 12 to resume their operating positions b, the valves 5, 6 to return to their open positions and the valve 7 to move to its closed position, thus enabling the valve 8 to resume active control over the movements of piston 1.

A slide valve 10, manually or optionally electromagnetically operated, is arranged parallel to the valve 8 and the valve 7. The port $P_4$ of valve 10 is connected via line 45 and one-way valve 47 with the conduit 14 which leads to port P; the port $T_4$ of valve 10 is connected via line 46 and one-way valve 48 with the conduit 20 which leads to port T. Port $A_4$ is connected via line 49 and a one-way valve 50 (which can, however, be unblocked to permit reverse flow) and adjustable throttle 51 with the conduit 17 which leads to port A; port $B_4$ is connected via line 52 with the valve chamber of the unblockable one-way valve 50. This makes it possible to carry out control of the electrode movement independently of the automatic regulation, in the event the control system malfunctions or if a function test of the arc furnace is to be made. The lines 14, 17, 25, 34, 45, 49, 53 which all carry pressurized working fluid or control fluid, can be additionally blocked by valves 55 so that the individual control devices forming integrated parts of the overall unit, can be replaced with others in a simple manner.

Conduits 14 and 25, and 14 and 34, are connected via lines 57 and 58 which can be closed by plugs 56. This offers the possibility of using two different media for the working fluid and for the control fluid. Moreover, if line 58 is blocked in the event valve 8 malfunctions and valve 7 opens as an automatic consequence of such malfunction, the piston 2 can be moved out of its cylinder at a pressure which differs from the pressure controlled by the valve 8 which communicates with port P. The one-way valves 30, 21 and 48 in the return lines 24, 20 and 46 of the control valves 11, 12, 8 and 10 prevent a backflow of the pressure medium if one or more of these control valves are being replaced (e.g., due to malfunction).

While the invention has been illustrated and described as embodied in an electrode-position control for arc furnaces, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various application without omitting features that, from the standpoint of prior art, fairly constitute essential characteristics of the generic or specific aspects of this invention.

What is claimed as new and desired to be protected by Letters Patent is set forth in the appended claims.

1. An electrode position control for arc furnaces comprising a hydraulically operated cylinder and piston unit having a cylinder chamber and a plunger piston extending into said cylinder chamber and connected to an electrode to be moved; a three-position control valve; a first pressure conduit connecting said control valve with a source of pressure fluid; a working conduit connecting said control valve with said cylinder chamber, said control valve being movable from a neutral position to a first operating position connecting said working chamber with a reservoir so that pressure fluid will flow out from said cylinder chamber to lower said electrode and a second operating position connecting said working conduit with a pressure source so that pressure fluid will flow into said cylinder chamber to raise said electrode; a first preselectable two-way valve movable between a closed and an open position in said first pressure conduit; a second preselectable two-way valve movable between an open and a closed position in said working conduit; a second pressure conduit connecting said chamber directly with said pressure source; a third preselectable two-way valve movable between an open and a closed position in said pressure conduit, and means cooperating with said two-way valves for moving said first and second two-way valves to said closed position while moving said third two-way vlave to said open position and vice versa.

2. An electrode position control as defined in claim 1, wherein said means cooperating with said two-way valves comprise a first preselection control valve coordinated with said first and said second two-way valves and a second preselection control valve coordinated with said third two-way valve.

3. An electrode position control as defined in claim 2, wherein said preselection control valves are electromagnetically operated three-way valves having each two operating positions including a starting position in which the valve is held when deenergized by a spring, and wherein said first preselection control valve coordinated with said first and second two-way valves is connected to the latter so that said first and second two-way valves are in said closed position when said first preselection control valve is in said staring position, and wherein said second preselection control valve is connected to said third two-way valve so that the latter is in said open position when said second preselection control valves is in said starting position.

4. An electrode position control as defined in claim 1, wherein said control valve is an electromagnetically operated valve.

5. An electrode position control as defined in claim 1, and including a manually operated three-position valve connected in parallel to said control valves between said pressure source and said cylinder chamber.

* * * * *